Dec. 14, 1954   A. G. HELGESON   2,696,688
RECORD MEDIA FEEDING APPARATUS
Filed Feb. 24, 1950   2 Sheets-Sheet 1
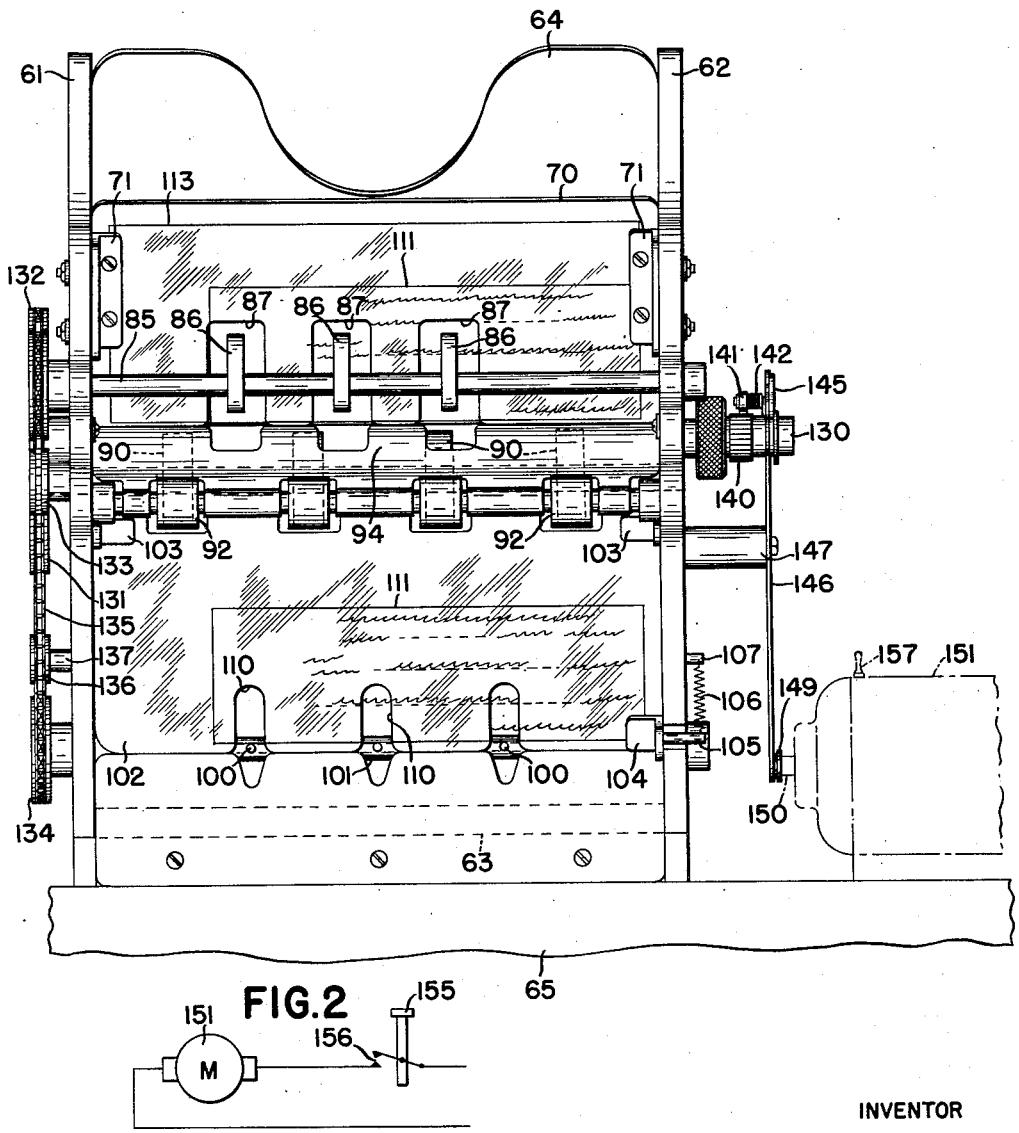
INVENTOR
ANGUS G. HELGESON
BY
HIS ATTORNEYS Dec. 14, 1954　　　A. G. HELGESON　　　2,696,688
RECORD MEDIA FEEDING APPARATUS
Filed Feb. 24, 1950　　　2 Sheets-Sheet 2
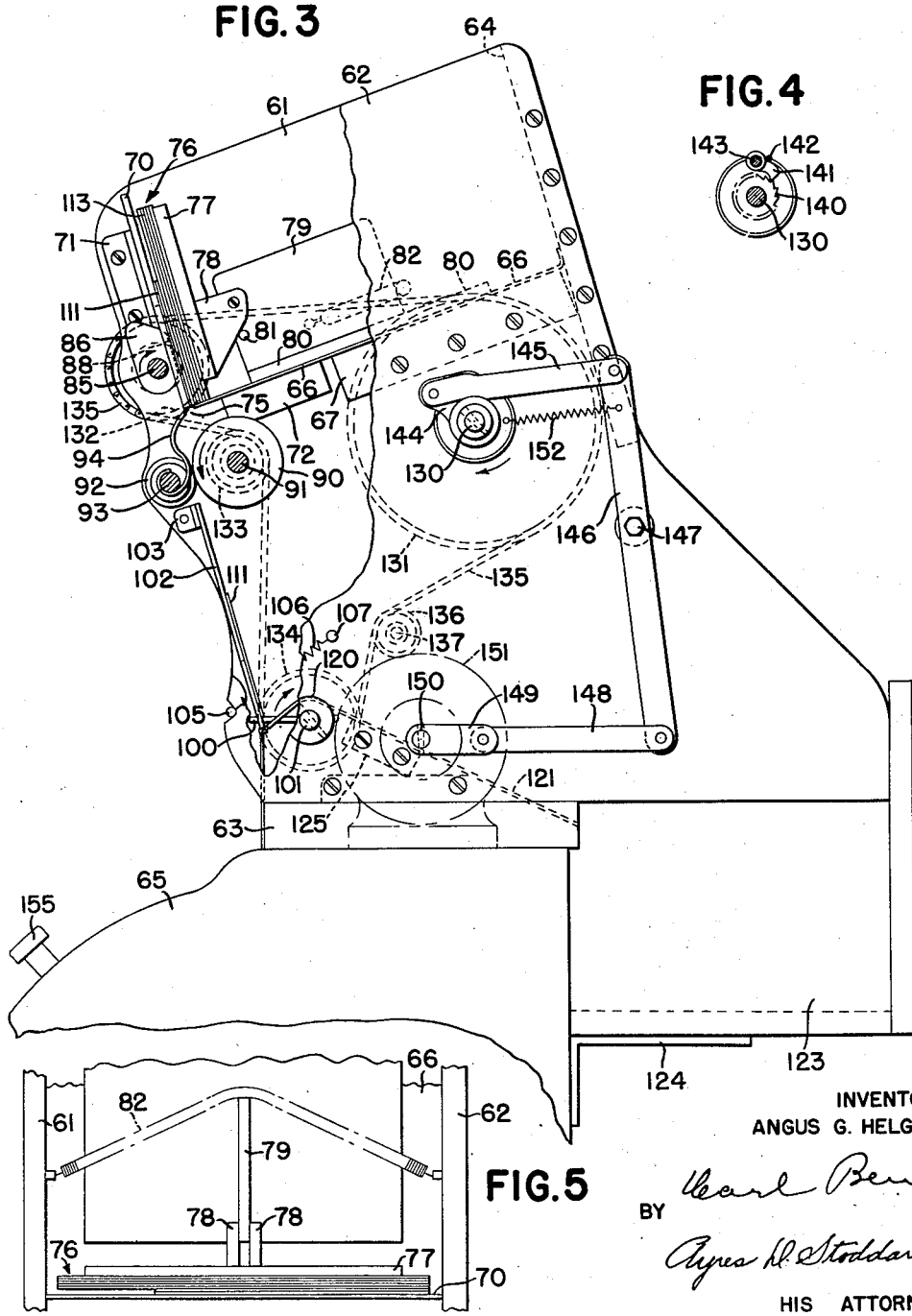
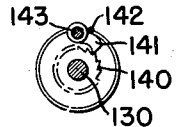
INVENTOR
ANGUS G. HELGESON
HIS ATTORNEYS United States Patent Office 2,696,688
Patented Dec. 14, 1954

2,696,688

RECORD MEDIA FEEDING APPARATUS

Angus G. Helgeson, Birmingham, Mich., assignor to The National Cash Register Company, Dayton, Ohio, a corporation of Maryland Application February 24, 1950, Serial No. 146,045

8 Claims. (Cl. 40—78)

This invention relates to an apparatus for feeding record media, such as cards or checks, one at a time, from an assemblage or stack of such cards or checks which is in such a location as to make the face of the check visible in sufficient degree to identify the signature on the check and other pertinent information as to the proper account to which the check or card should be posted or charged. The foremost card is then fed into a position to completely expose the face of the card or chack which has been fed from the stack and then inverted, and causing it to be deposited into a receptacle, face down, whereby the cards or checks are thus stacked in said receptacle in the same order or sequence as they were when originally placed in the apparatus before being removed one at a time therefrom.

This invention is well adapted for use in banks, in their posting departments and particularly in connection with a posting machine of the type illustrated and described in the Spurlino et al. Patent No. 2,375,594. It is also well suited to be used on all types of media handling in connection with similar posting and statistical machines.

One of the old methods of handling checks in the posting departments of banks is for the operator to manually leaf through a pile or stack of checks and record the data from each check into the machine as she leafs through the stack.

By the use of the present invention, in connection with the posting of checks, much time and labor is saved due to the fact that the checks are not individually handled after they are placed in the stack, but the stack is put into the apparatus and the first or foremost check of the stack is then fed into a position whereby the face of the check is fully exposed so that the operator may read the amounts therefrom, and also the maker of the check, for posting purposes.

The apparatus is so connected to the machine that when the operator strikes the machine release or motor key of the machine, after having posted the amount of the check, the depression of this motor key also causes the driving mechanism for the apparatus to function, to feed the second check down into a fully exposed position and to simultaneously invert the first check that has been fed down, and cause it to be deposited face down into a receptacle.

An alternate plan would be to have the feeding of the check caused by the depression of the first amount key depressed if so desired in order to speed up the timing of the feed of the checks relative to the posting of the data therefrom.

As the checks are thus fed from the stack in the top portion of the apparatus they are also automatically stacked in a receptacle in the same order or sequence that they were in when originally placed in the check feeding apparatus.

The present invention has many advantages over other types of check feeding mechanisms in that in the present invention it matters not whethe rthe checks are all the same size, nor does it matter whether or not the checks are crumpled, as many of them are when they are returned to the banks for cancellation.

In certain other types of check feeding mechanisms which are known as the picker types, the checks must be fed one at a time by a "picker" which engages the top edge of the check and moves it downwardly. Many of the checks are what are known as "dog-eared," and, therefore the picker mechanism does not always function properly, due to the bad edges of the checks.

The present apparatus feeds the check by contacting the face thereof, moving the check downwardly off of the original stack, without in any way engaging the edge of the check. Moreover the thickness of the check does not in any way interfere with the feeding of the checks from the stack, since, as before mentioned, the checks are fed by contact with the face of the check instead of contact with the edges of the checks.

It is, therefore, an object of the present invention to provide an apparatus for feeding record media, such as cards or checks, one at a time, from a stack or an assemblage of such checks into a position to completely expose the face of the check which has been thus fed, whereby the operator may read therefrom the amount of the check and also the maker's name for posting purposes.

It is another object of this invention to provide an apparatus for feeding checks by contact with the face of the check, to move the check from an assembly or a stack of checks into a position to completely expose the face of the check.

A further object of the present invention is to provide an apparatus for feeding the record media, such as cards or checks of various sizes and various thicknesses.

It is a further object of the present invention to provide an apparatus for feeding record media, from a stack, into a position to fully expose the face of the record media, and then invert said record media and cause it to be deposited in a receptacle, whereby the record media, after having been deposited in the receptacle is in the same order or sequence that it was in when originally placed in the stack before feeding.

A still further object of the present invention is to provide an apparatus for automatically feeding record media, such as cards or checks, from a stack, into a position to expose the face of the said check and then invert the said check, cause it to be deposited face down in a receptacle, and simultaneously feed a second check from the original stack into a position to fully expose the face of said second check.

With these and incidental objects in view the invention includes certain novel features of construction and combinations of parts, the essential elements of which are set forth in appended claims, and a preferred form or embodiment of which is hereinafter described with reference to the drawings which accompany and form a part of this specification.

In said drawings:

Fig. 1 is a front elevation of the record media feeding apparatus, and shows in dot and dash lines a motor for driving the operating shaft of the apparatus.

Fig. 2 is a diagram showing one of the machine release keys of an accounting machine to close a circuit through the apparatus-operating motor when the machine proper is released for operation.

Fig. 3 is a side elevation of the apparatus, partly broken away to better show some of the mechanism, the apparatus being shown on top of an accounting machine.

Fig. 4 is a detail view of the ratchet and pawl drive for the apparatus operating shaft.

Fig. 5 is a plan view, partly broken away, showing the pressure device for retaining the record media in a compartment.

GENERAL DESCRIPTION

Described in general terms, the invention includes an apparatus for feeding record media, such as cards or checks from a stack placed in a top compartment of the apparatus, with a flexible means for feeding the foremost card or check from the stack into a position to have the face thereof fully exposed so that when used in connection with posting transactions in a bank the operator can readily read the amount of the check and also the maker's name, for posting purposes.

As the checks are fed one at a time from the stack in the upper compartment of the apparatus they are advanced so that the lower edge thereof is gripped by feed rollers and deposited on a device so that the full face of the check is visible to the operator.

During the operation of feeding a second check from the stack, the device upon which the first check rests is operated to invert the check, to cause it to be deposited into a receptacle, face downward, after which said second check is deposited on this inverting device.

The feeding fingers which feed the front check from the stack, and also the feed rollers, and the device for inverting the check, are all driven from a common shaft through the medium of sprocket wheels and a sprocket chain. The common shaft is operated by a ratchet and pawl mechanism, which in turn is driven by an electric motor.

The apparatus is shown, for illustrative purposes, as being attached to the top of an accounting machine of the type illustrated in the above mentioned Spurlino et al. Patent No. 2,375,594, which is a machine adapted for use in posting departments of banks.

After the amount of the check has been set up on the keyboard of the machine the operator depresses a machine release key, which causes the machine to go through its normal operation, as fully illustrated and described in said patent. This motor operating or machine release key operates to close a switch in circuit with the motor which drives the main drive shaft of the feeding apparatus.

DETAILED DESCRIPTION

The apparatus for feeding record media, such as cards and checks, includes a left side frame 61 and a right side frame 62 (Figs. 1 and 3) secured to a base 63. A back plate 64 connects the side frames 61 and 62 to give rigidity to the framework.

For illustrative purposes, the apparatus, through the base 63, is fastened to the top of an accounting machine designated by the reference number 65.

The card or check receiving compartment is formed in the top part of the apparatus by means of a plate 66 resting on a bar 67, which extends between the side frames 61 and 62. The plate 66 also extends between the side frames 61 and 62, and from the back plate 64 forwardly to a point just to the rear of a transparent plate 70, which forms the front of the check or card receiving compartment. This transparent plate 70 is held in place by brackets 71, secured to the side frames 61 and 62.

To give rigidity to the forward end of the plate 66 it is provided with two downwardly-turned flanges 72 (only one of which is shown), which rest against the insides of the frames 61 and 62.

The transparent plate 70 and the plate 66 are so located with relation to each other that the lower inside edge of the plate 70 is just forward of the forward edge of the plate 66, thus forming an opening 75 through which the checks are fed in the manner to be hereinafter described.

In Fig. 3 is shown a batch or stack of checks designated as 76, the forward or front one of which is in contact with the rear side of the transparent plate 70, and so held by a pressure plate 77, having arms 78, by means of which it is pivoted to a pressure block 79, secured to a base 80, slidable on the plate 66. A pin 81 on the pressure block 79 prevents the pressure plate 77 from moving down any lower than the position shown in Fig. 3.

To provide pressure for the pressure plate 77 and pressure block 79, a closely-wound coil spring 82 (Figs. 3 and 5) is secured to the side frames 61 and 62 and stretched across the back of the pressure block 79.

Card or check feeding mechanism

Secured to a feeding shaft 85 (Figs. 1 and 3), supported by the side frames 61 and 62, and which shaft is given one complete rotation in a clockwise direction by means to be hereinafter described, are three feeding fingers 86, each having a flattened surface 88 normally lying against the face of the foremost check in the stack 76. The transparent plate 70 is provided with three openings 87, through which the feeding fingers 86 project to contact and feed the checks.

As the shaft 85 is rotated in a clockwise direction, the fingers 86 are consequently rotated in the same direction, and due to the fact that they are made out of a comparatively soft flexible material, they will grip the foremost check in the stack 76 and feed it downward through the opening 75 until the bottom edge of the check is gripped by feeding rollers 90 and 92 secured to shafts 91 and 93, respectively, carried by the side frames 61 and 62. A deflecting or guide plate 94 mounted on the shaft 93 guides the check so as to insure that it will be gripped by the feed rollers 90 and 92. These rollers 90 also rotate substantially one full rotation, each check feeding operation, and, therefore, cause the check to be deposited on three pins 100, which are carried by a shaft 101, supported by the side frames 61 and 62. This shaft 101 is driven in a clockwise direction each check feeding operation.

As the fed check rests on the pins 100 it also rests against a transparent plate 102, supported by brackets 103 pivoted to the side frames 61 and 62.

A bracket 104 secured to the lower portion of the plate 102 has a pin 105 to which is connected a spring 106, in turn connected to a pin 107, secured to the frame 62. This spring holds the transparent plate 102 in the position shown in Figs. 1 and 3.

Since the shaft 101 and pins 100 are rotated in a clockwise direction, the transparent plate 102 has three recesses 110 as clearance for the pins 100, as the shaft 101 rotates for a purpose and by means to be hereinafter described.

As has been earlier pointed out, the present apparatus is arranged to take care of different size checks, and for illustrative purposes there is shown in Figs. 1 and 3 two different size checks numbered 111 and 113.

In Fig. 3 the small size check 111 is shown after having been fed from the main stack of checks 76, as resting against the transparent plate 102 and on the three pins 100 on the check inverting shaft 101.

As above mentioned, the shaft 101 and the pins 100 are given a complete clockwise rotation during each check feeding operation, and when this occurs the pins 100 raise the check 111 up so that the lower edge thereof passes a point 120 of a plate 121, which is secured to the base 63. This plate 63 extends upwardly and over the shaft 101 and then forwardly to straddle the pins 100 when they are in their normal positions, as shown in Fig. 3.

As the bottom edge of the check 111 passes the point 120, the pins 100 then push the check toward the rear with its face downwardly, whereupon it is deposited, face down, on the plate 121, from whence it slides downwardly into a check receiving receptacle 123, mounted on brackets 124, secured to the accounting machine 65.

This plate 121, in addition to being mounted on the base 63, is provided with two ears 125 (only one of which is shown) by means of which it is secured to the side frames 61 and 62, to hold it in the position shown in Fig. 3 above the shaft 101.

Card or check feed drive

To drive the check feed fingers 86, the check feed rolls 90, and the check inverting shaft 101 and inverting pins 100 there is provided a sprocket and chain driving mechanism which will now be described.

Mounted in the side frames 61 and 62 is a drive shaft 130 (Figs. 1, 3 and 4) having secured to the left end thereof a sprocket wheel 131. Secured to the feeding finger shaft 85 is a smaller sprocket wheel 132, and secured to the feed roll shaft 91 is a sprocket pinion 133. The check inverting shaft 101 has secured thereto a sprocket wheel 134, which is of the same size as the sprocket wheel 132.

An endless sprocket chain 135 engages the sprockets on the sprocket wheels 131, 132, and 134, and also the sprocket pinion 133, to drive the shafts 85, 91, and 101, from the motion received by the drive shaft 130. The sprocket chain 135 also engages an idler sprocket pinion 136, mounted on a stud 137, carried by the outside of the side frame 61.

The drive shaft 130 receives only a partial rotation each check feeding operation by means to be hereinafter described. The ratio of the sprocket wheel 131 and the sprocket wheel 132 is such that the partial rotation of the sprocket wheel 131 is sufficient to turn the sprocket wheel 132, and consequently the feeding fingers 86, one complete rotation each check-feeding operation. The sprocket wheel 134 is of the same ratio as the sprocket wheel 132, and, therefore, this sprocket wheel 134 receives one complete rotation each check feeding operation so as to always bring the inverting pins 100 back to the position shown in Fig. 3 at the end of each operation.

The drive shaft 130 receives its motion from a ratchet and pawl drive, which in turn is driven from an electric motor.

Secured to the drive shaft 130 is a ratchet 140 (Fig. 4) with which cooperates a spring-pressed pawl 141, which is held in contact with the ratchet 140 by a torsion spring 142. The pawl 141 is pivoted on a stud 143 carried by an arm 144 (Fig. 3) which is pivoted on the shaft 130. Pivoted to the pawl carrying arm 144 is a link 145 also pivoted to the upper end of a lever 146, which is pivoted on a stud 147 carried by the side frame 62.

The lower end of the lever 146 is connected by a link 148 to a crank arm 149 secured to an armature shaft 150 of a motor 151.

One rotation of the motor armature shaft 150, through the crank 149 and link 148, rocks the lever 146 first clockwise and then counterclockwise to its normal position. A spring 152 acts as a homing spring for the lever 146, pawl 141, and pawl arm 144.

During the clockwise movement of the lever 146 the link 145 rocks the arm 144 clockwise, whereupon the pawl 141 drives the ratchet 140, and consequently the shaft 130, in a clockwise direction a part of one rotation.

As above stated, this partial rotation of the shaft 130 through the sprocket chain 135 drives the feeding finger shaft 85, and consequently the feeding fingers 86 one complete rotation to feed the foremost check from the check stack 76 in the manner previously described, downwardly through the opening 75, whereby said check is picked up by the rollers 90 and 92, the former being driven by the sprocket chain 135 through the sprocket pinion 133, whereupon the check is deposited on the inverting pins 100 and lies face against the transparent plate 102.

During this motion of the shafts 85 and 91, the shaft 101 is likewise rotated one complete rotation and the check which had previously been fed downwardly and deposited on the pins 100 is raised so that its lower end is up over the point 120 of the plate 121, whereupon the fingers 100 continue to push this check to the rear or to the right, as viewed in Fig. 3, so that it will be deposited face down on the plate 121 and consequently slide from there into the check receptacle 123, face down.

As has been previously stated the check feeding apparatus is operated each time the operator operates the accounting machine, and therefore to start the motor, the motor operating keys, one of which is shown and designated 155, in Figs. 2 and 3, is so constructed as to close a switch 156 in circuit with the motor 151 to cause the motor to operate.

In order to get the first check of a stack off of the stack 76 and down into the position on the inverting pins 100 so that the operator may post the amount from such check, without having to operate the accounting machine, a toggle switch 157 is on the motor and is operated to cause the motor to be driven through the first operation in order to feed the foremost check from the stack 76 down into its posting position on the inverting pins 100.

While the form of mechanism herein shown and described is admirably adapted to fulfill the objects primarily stated, it is to be understood that it is not intended to confine the invention to the particular forms or embodiments herein disclosed, for it is susceptible of embodiment in various forms.

What is claimed is:

1. In an apparatus of the class described, the combination of a compartment in said apparatus for receiving a stack of record media; a transparent member serving as the front of said compartment and against which said record media are stacked, the faces of all media being toward said member, said member having openings therein; pressure means to retain the foremost record media of the stack against said member; means contacting the foremost record media of said stack, through the openings in said member, to feed said foremost record media downwardly off of said stack; means to feed said foremost record media further downward to cause it to be deposited into a position accessible for posting data therefrom; a transparent plate against which the face of said foremost record media rests when in said position; means upon which the bottom edge of said foremost record media rests when in said position; and means for operating said last mentioned means to remove said foremost record media from said position, invert the media, and cause the media to be deposited in said inverted condition into a receptacle.

2. In an apparatus of the class described, the combination of a compartment in said apparatus for receiving a stack of record media; a transparent member serving as the front of said compartment, and against which said record media are stacked, the faces of all media being toward said member, said member having openings therein; pressure means to retain the foremost record media of the stack against said member; means contacting the foremost record media of said stack, through the openings in said member, to feed said foremost record media downwardly off of said stack; means to feed said foremost record media further downward to cause it to be deposited into a position accessible for posting data therefrom; a transparent plate against which the face of said foremost record media rests when in said position; means upon which the bottom edge of said foremost record media rests when in said position; means for operating said last mentioned means to remove said foremost record media from said position, invert the media, and cause said media to be deposited in said inverted condition into a receptacle; and means to actuate said operating means and to simultaneously actuate both of said feeding means to feed a second record media from said stack and deposit said second media in said accessible position against said transparent plate.

3. In an apparatus of the class described, the combination of a compartment in said apparatus for receiving a stack of record media; a transparent member serving as the front of said compartment and against which said record media are stacked, the faces of all media being toward said member, said member having openings therein; pressure means to retain the foremost record media of the stack against said member; rotatable flexible members contacting the foremost record media of the stack, through the openings in said member, to feed said foremost record media from said stack; a rotatable shaft to which said members are secured; feed rollers adapted to engage and feed said foremost record media further downward; means to receive said foremost record media after it leaves said feed rollers; and a device to rotate said receiving means to invert said media and cause it to be deposited in a receptacle.

4. In an apparatus of the class described, the combination of a compartment in said apparatus for receiving a stack of record media of different sizes and different thicknesses; a transparent member serving as the front of said compartment and against which said record media are stacked, the faces of all media being toward said member, said member having openings therein; a pressure device to retain the foremost record media of the stack against said member; rotatable flexible members contacting the foremost record media of the stack, through the openings in said member to feed said foremost record media from said stack; a rotatable shaft to which said members are secured; feed rollers adapted to engage and feed said foremost record media further downward and deposit it against a transparent plate having openings in the lower portion thereof; a second rotatable shaft; finger members projecting from said shaft through said openings in said transparent plate, said fingers being in a position to receive the bottom edge of the said foremost record media after its second feed, and while it is resting against said transparent plate; driving means on each of said rotatable shafts adapted to rotate said shafts simultaneously; and common means connected to both of said driving means to actuate the same.

5. In an apparatus of the class described adapted to be used in connection with an accounting machine for recording and posting data from record media, said accounting machine having a machine release key to cause the machine to make a cycle of operation to register and record the data posted on the usual amount keys thereof; a compartment in said apparatus for receiving a stack of record media; a transparent member serving as the front of said compartment and against which said record media are stacked, the faces of all media being toward said member, said member having openings therein; a pressure device to retain the foremost record media of the stack against said member; rotatable means contacting the foremost record media of said stack, through openings in said member, to feed said foremost record media off of said stack; a rotatable shaft to which said rotatable means is secured; feed rollers to feed said foremost record media further and cause it to be deposited into a position accessible for posting data therefrom; a transparent plate against which the face of said foremost record media rests when in said position; said transparent plate having openings in the lower portion thereof; a second rotatable shaft; fingers projecting radially from said second shaft through the openings in said transparent plate and upon which the bottom edge of said foremost record media rests when in said posting position; operating means for said rotatable shafts; actuating means for said operating means adapted to be set in motion to actuate said rotating means upon operation of said accounting machine operating key.

6. In an apparatus of the class described, adapted to be used in conjunction with an accounting machine used to register and record data from record media, said accounting machine having a machine releasing means to cause the machine to be set in motion to register and record the data posted therein from said record media; a compartment in said apparatus for receiving a stack of record media of varying sizes and varying thicknesses; a transparent member serving as the front of said compartment and against which said record media are stacked, the faces of all media being toward said member, said member having openings therein; a pressure device to retain the foremost record media of the stack against said member; rotatable flexible fingers contacting the foremost record media of the stack, through the openings in said member to feed said foremost record media off of said stack; a rotatable shaft to which said flexible members are secured; feed rollers to feed said foremost record material further after it leaves said stack, and cause it to be deposited into a position accessible for posting therefrom; a transparent plate against which the face of said foremost record media rests when in said posting position, said transparent plate having openings in the lower portion thereof; a second rotatable shaft; radial means projecting from said shaft and extending through the openings in said plate and upon which the bottom edge of said foremost record media rests when it has been moved into said posting position; a sprocket wheel and chain drive device to rotate both of said rotatable shafts simultaneously; means for actuating said sprocket wheel and chain device; and means intermediate said actuating means and said accounting machine release means to set said actuating means in motion upon operation of the machine release means.

7. In an apparatus of the class described, the combination of friction means to successively contact the face of the foremost record media of a stack of such media; means to apply pressure to said stack of media to press the face of the foremost record media normally against said friction means; means to move said friction means to cause the latter to remove the foremost media from said stack; feeding means to grip and feed each successively removed media and deposit the media into a position of accessibility posting data therefrom; devices including a plurality of members normally in a horizontal position to receive and support said deposited media in a substantially vertical position; and means including a rotatable driver to move said members upwardly from said horizontal position into a vertical position to lift the deposited media, to contact the faces thereof, to invert the media and cause said media to be stacked in the same order in which they were originally stacked.

8. In an apparatus, according to claim 7 wherein said horizontally positioned members and said rotatable driver to move said members, comprise a plurality of pins and a shaft from which said pins project radially and in the same direction and wherein said shaft is rotated to move the pins whereby said pins lift the deposited media, contact the faces thereof, invert said media and cause them to be stacked in the same order in which they were originally stacked.

References Cited in the file of this patent

UNITED STATES PATENTS

| Number | Name | Date |
|---|---|---|
| 378,345 | Valentine | Feb. 21, 1888 |
| 479,687 | Welleba et al. | July 26, 1892 |
| 951,143 | McCaskey | Mar. 8, 1910 |
| 1,016,677 | Dannheiser | Feb. 6, 1912 |
| 1,093,401 | Gottlieb | Apr. 14, 1914 |
| 1,370,436 | Gurtler | Mar. 1, 1921 |
| 1,743,158 | Morse | Jan. 14, 1930 |
| 1,847,139 | Seaholm et al. | Mar. 1, 1932 |